(12) United States Patent
Iwanaga et al.

(10) Patent No.: US 12,310,399 B2
(45) Date of Patent: May 27, 2025

(54) NON-COMBUSTIBLE HEATING-TYPE SMOKING ARTICLE, ELECTRIC HEATING-TYPE SMOKING SYSTEM, AND METHOD FOR PRODUCING NON-COMBUSTIBLE HEATING-TYPE SMOKING ARTICLE

(71) Applicant: JAPAN TOBACCO INC., Tokyo (JP)

(72) Inventors: Kenichi Iwanaga, Tokyo (JP); Toru Sakurai, Tokyo (JP); Noriko Osawa, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 314 days.

(21) Appl. No.: 17/233,850

(22) Filed: Apr. 19, 2021

(65) Prior Publication Data
US 2021/0235747 A1 Aug. 5, 2021

Related U.S. Application Data

(63) Continuation of application No. PCT/JP2018/045100, filed on Dec. 7, 2018.

(51) Int. Cl.
*A24D 1/20* (2020.01)
*A24C 5/01* (2020.01)
(Continued)

(52) U.S. Cl.
CPC .............. *A24D 1/20* (2020.01); *A24C 5/01* (2020.01); *A24D 1/002* (2013.01); *A24D 1/02* (2013.01);
(Continued)

(58) Field of Classification Search
CPC . A24D 1/20; A24D 3/17; A24D 1/002; A24D 1/02; A24D 3/043; A24D 1/004;
(Continued)

(56) References Cited

U.S. PATENT DOCUMENTS 4,818,779 A * 4/1989 Witucki ................ C09J 131/04
524/297
5,329,004 A 7/1994 Eden et al.
(Continued)

FOREIGN PATENT DOCUMENTS

| CN | 1093556 A | 10/1994 |
|---|---|---|
| CN | 1290131 A | 4/2001 |

(Continued)

OTHER PUBLICATIONS

English machine translation of CN 108030148 A; Zhou; May 15, 2018; 12 pages; A24D3/10 (Year: 2018).*
(Continued)

*Primary Examiner* — Linda L Gray
(74) *Attorney, Agent, or Firm* — Birch, Stewart, Kolasch & Birch, LLP

(57) ABSTRACT

A non-combustible heating-type smoking article includes: a tobacco filler; and a wrapper enclosing the tobacco filler. The wrapper includes: a substrate sheet made of metal; a first sheet made of paper and bonded to one surface of the substrate sheet on a side of the tobacco filler; and a second sheet made of paper and bonded to one other surface of the substrate sheet on a side opposite to the one surface.

20 Claims, 6 Drawing Sheets

(51) Int. Cl.
  *A24D 1/00* (2020.01)
  *A24D 1/02* (2006.01)
  *A24D 3/04* (2006.01)
  *A24D 3/17* (2020.01)
  *A24F 40/20* (2020.01)
  *B32B 7/12* (2006.01)
  *B32B 15/12* (2006.01)
  *B32B 37/12* (2006.01)
  *B32B 37/20* (2006.01)

(52) U.S. Cl.
  CPC .............. *A24D 3/043* (2013.01); *A24D 3/17* (2020.01); *A24F 40/20* (2020.01); *B32B 7/12* (2013.01); *B32B 15/12* (2013.01); *B32B 37/12* (2013.01); *B32B 37/20* (2013.01); *B32B 2250/03* (2013.01); *B32B 2250/40* (2013.01); *B32B 2255/06* (2013.01); *B32B 2255/12* (2013.01); *B32B 2255/26* (2013.01); *B32B 2311/00* (2013.01); *B32B 2317/12* (2013.01); *B32B 2554/00* (2013.01)

(58) Field of Classification Search
  CPC .. A24F 40/20; A24C 5/01; B32B 7/12; B32B 15/12; B32B 37/12; B32B 37/20
  USPC ........................................................ 131/274
  See application file for complete search history.

(56) References Cited

U.S. PATENT DOCUMENTS

| | | | |
|---|---|---|---|
| 5,549,125 | A | 8/1996 | White |
| 5,551,451 | A | 9/1996 | Riggs et al. |
| 6,367,481 | B1 | 4/2002 | Nichols et al. |
| 2002/0174875 | A1 | 11/2002 | Nichols et al. |
| 2004/0154630 | A1 | 8/2004 | Tabuchi et al. |
| 2006/0011206 | A1 | 1/2006 | Clarke |
| 2006/0021624 | A1* | 2/2006 | Gonterman .............. A24D 3/14 131/335 |
| 2007/0215167 | A1 | 9/2007 | Llewellyn Crooks et al. |
| 2008/0017206 | A1* | 1/2008 | Becker .................... A24C 5/01 131/276 |
| 2008/0092912 | A1 | 4/2008 | Robinson et al. |
| 2011/0192408 | A1 | 8/2011 | Inagaki et al. |
| 2013/0137561 | A1 | 5/2013 | Sampson et al. |
| 2013/0239983 | A1* | 9/2013 | Burke ..................... A24D 3/14 131/334 |
| 2016/0331031 | A1 | 11/2016 | Malgat et al. |
| 2016/0331032 | A1* | 11/2016 | Malgat .................. H05B 6/108 |
| 2017/0055576 | A1 | 3/2017 | Beeson et al. |

FOREIGN PATENT DOCUMENTS

| | | | | |
|---|---|---|---|---|
| CN | 107772529 | A | | 3/2018 |
| CN | 108030148 | A | | 5/2018 |
| EP | 0 482 872 | A1 | | 4/1992 |
| JP | 4-262773 | A | | 9/1992 |
| JP | 5-320698 | A | | 12/1993 |
| JP | 6-98747 | A | | 4/1994 |
| JP | 9-47272 | A | | 2/1997 |
| JP | 2000-270831 | A | | 10/2000 |
| JP | 2006-503572 | A | | 2/2008 |
| JP | 2009-529871 | A | | 8/2009 |
| JP | 2010-606594 | A | | 3/2010 |
| JP | 2013-526272 | A | | 6/2013 |
| JP | 2018-538848 | A | | 12/2016 |
| JP | 2018-531587 | A | | 11/2018 |
| JP | 2018-538863 | A | | 12/2018 |
| KR | 10-0294308 | B1 | | 9/2001 |
| KR | 10-2005-0056258 | A | | 6/2005 |
| KR | 10-2006-0039455 | A | | 5/2006 |
| KR | 10-2018-0111460 | A | | 10/2018 |
| WO | 0 777 977 | A | * | 6/1997 .............. A24D 3/08 |
| WO | WO 2010/047389 | A1 | | 4/2010 |

OTHER PUBLICATIONS

English machine translation of CN-1093556-A; Riggs; Oct. 19, 1994; 14 pages; A24F42/10 (Year: 1994).*
English machine translation of WO 2018110834 A2; Han; Jun. 21, 2018; 167 pages. (Year: 2018).*
English machine translation of CN 1131004 A; Matsumura; Sep. 18, 1996; 48 pages. (Year: 1996).*
International Preliminary Report on Patentability and Written Opinion of the International Searching Authority, with an English translation, dated Jun. 17, 2021, for International Application No. PCT/JP2016/045100.
International Search Report (PCT/ISA/210) issued in PCT/JP2018/045100 mailed on Feb. 26, 2019.
Extended European Search Report for European Application No. 18942081.3, dated Jun. 28, 2022.
Chinese Office Action and Search Report for Chinese Application No. 201880099997.7 dated Nov. 3, 2022, with an English translation.
Korean Office Action for Korean Application No. 10-2021-7016150, dated Jul. 6, 2023, with an English translation.

* cited by examiner

NON-COMBUSTIBLE HEATING-TYPE SMOKING ARTICLE, ELECTRIC HEATING-TYPE SMOKING SYSTEM, AND METHOD FOR PRODUCING NON-COMBUSTIBLE HEATING-TYPE SMOKING ARTICLE

CROSS REFERENCES TO RELATED APPLICATIONS

This application is a Continuation Application of PCT Application No. PCT/JP2018/045100, filed on Dec. 7, 2018, the entire contents of which are incorporated herein by reference.

FIELD

The present invention relates generally to a non-combustible heating-type smoking article free from combustion, an electric heating-type smoking system, and a method for producing the non-combustible heating-type smoking article.

BACKGROUND

Aerosol generating articles have been disclosed. In these aerosol generating articles, an aerosol-forming substrate (cigarette rod) is heated without combustion, thereby an aerosol is generated as mainstream smoke. This aerosol forming-substrate is made difficult to ignite when an attempt is made to ignite in a manner as in traditional cigarettes. Specifically, the aerosol-forming substrate is enclosed by a sheet made of a nonflammable heat conductive material, such as a metal foil. This makes it difficult for a user to ignite the aerosol-forming substrate.

SUMMARY

According to one aspect of the present invention, a non-combustible heating-type smoking article includes: a tobacco filler; and a wrapper enclosing the tobacco filler. The wrapper includes: a substrate sheet made of metal; a first sheet made of paper and bonded to one surface of the substrate sheet on a side of the tobacco filler; and a second sheet made of paper and bonded to one other surface of the substrate sheet on a side opposite to the one surface.

DETAILED DESCRIPTION

Hereinafter, an embodiment of an electric heating-type smoking system will be described with reference to FIG. 1 to FIG. 6. The drawings schematically show each component of the invention. Thus, the dimensions of the drawings may not always match the dimensions of actual products.

Figure 1:
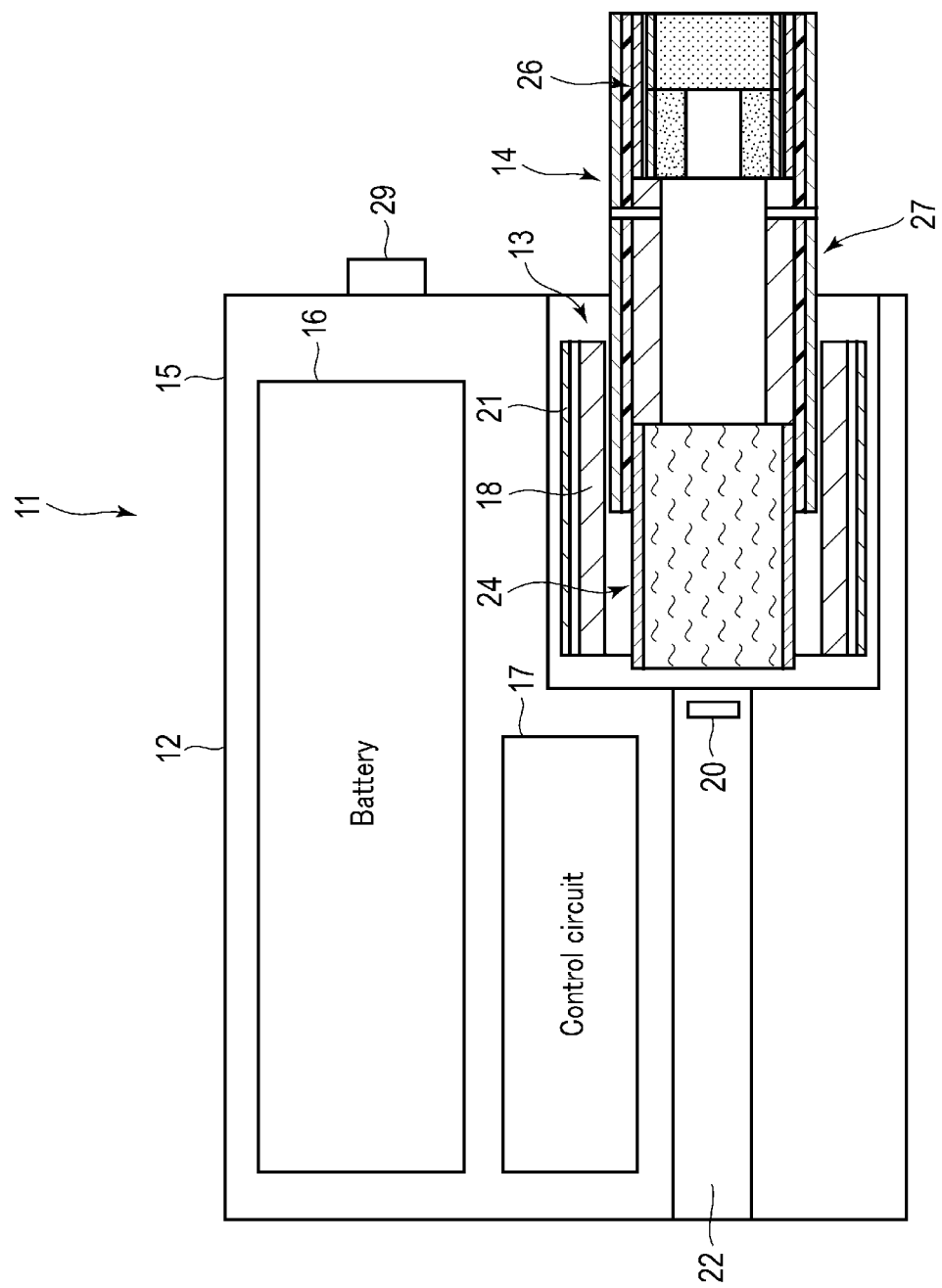
FIG. 1 is a cross-sectional schematic diagram showing an electric heating-type smoking system according to an embodiment.

As shown in FIG. 1, unlike in traditional cigarettes (cigarettes), an electric heating-type smoking system 11 is of a heating type that heats a tobacco filler through heating without combustion, and thereby the smoke aroma of tobacco can be tasted.

The electric heating-type smoking system 11 includes a main body 12 and a rod 14 (a non-combustible heating-type smoking article) that is configured to be attached to and detached from an insertion part 13 of the main body 12.

The main body 12 includes a box-shaped housing 15 and the insertion part 13 recessed into a cylindrical shape along the shape of the rod 14. The main body 12 include a battery 16, a control circuit 17, a pressure sensing part 20, a heat transfer part 18 (a heat exchanger tube), and a heater 21 provided around the heat transfer part 18, inside the housing 15. The housing 15 has a ventilation hole 22 and a switch 29 for activating the main body 12. The ventilation hole 22 communicates the outside of the housing 15 with the insertion part 13 and allows air to be supplied to the rod 14 inserted into the insertion part 13.

The control circuit 17 upon being supplied with power from the battery 16 energizes the heater 21 to adjust the temperature of the heater 21 within an appropriate range (100 to 400° C.). The pressure sensing part 20 includes a pressure sensor and is supplied with power from the control circuit 17. The pressure sensing part 20 senses a negative pressure inside the housing 15, thereby detecting that the user has inhaled.

The insertion part 13 is formed by recessing another portion of the housing 15 into a cylindrical shape.

The heat transfer part 18 has a hollow cylindrical shape. The heat transfer part 18 is made of a metal material. The metal material forming the heat transfer part 18 is preferably a metal having a high thermal conductivity, such as gold, silver, copper, aluminum, or an alloy using any of these metals.

The heater 21 is formed of, for example, a common heating wire such as a nichrome wire. The heater 21 is wound around the heat transfer part 18 and disposed in a cylindrical shape. Note that the heating manner of the heater 21 is not limited to a manner using Joule heat due to electric resistance, and may be, for example, an induction heating (IH) manner or a manner using a chemical reaction such as oxidation heat. In this case, the material and shape of the heat transfer part may be suitably selected according to the heating manner. Note that the heater 21, though configured to heat the rod 14 (non-combustible heating-type smoking article) from the outside, may be formed in the shape of a blade that can be inserted into the rod 14 (tobacco part 24) to heat the rod 14 from the inside.

Figure 2:
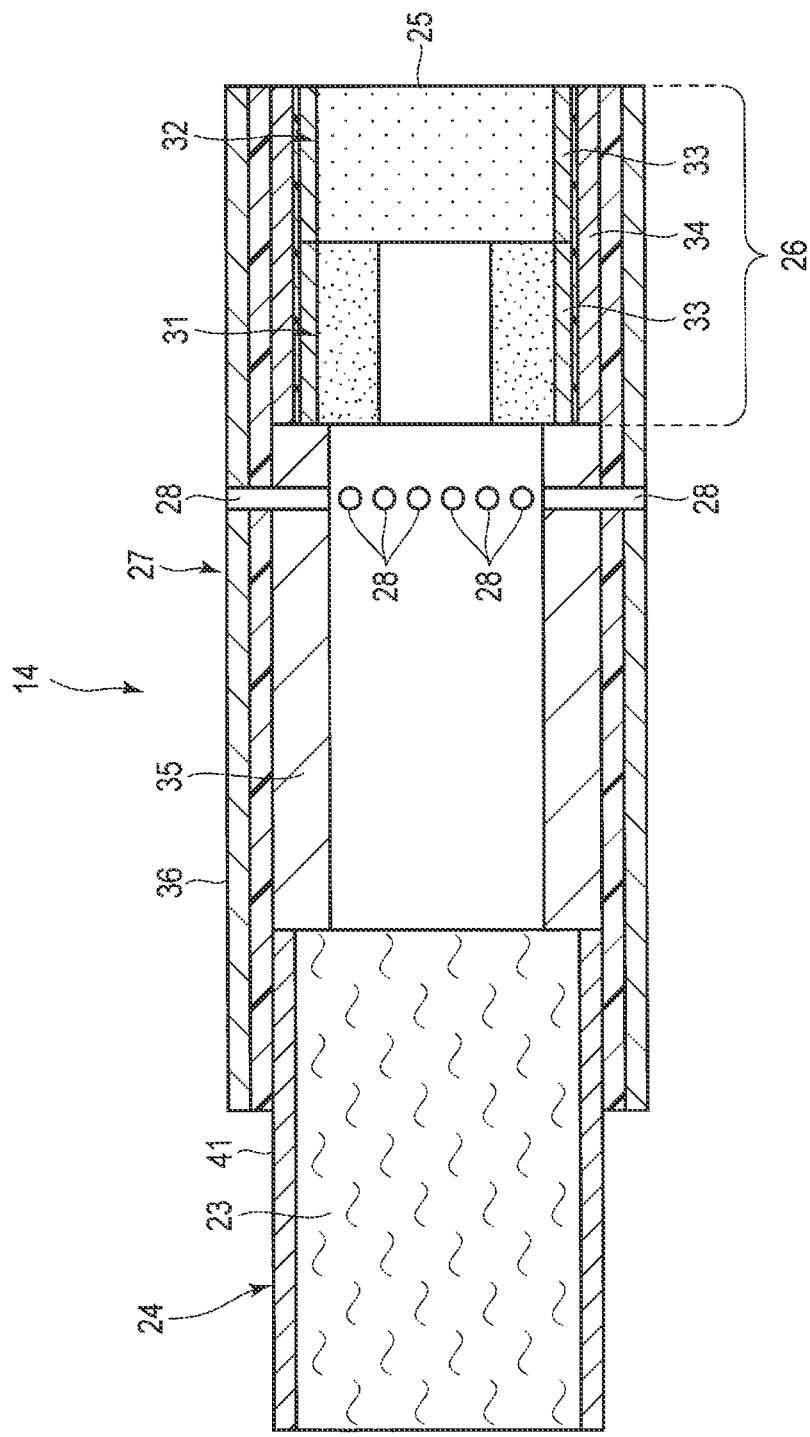
FIG. 2 is a schematic diagram showing an enlarged rod of the electric heating-type smoking system shown in FIG. 1.

As shown in FIG. 2, the rod 14 (non-combustible heating-type smoking article) is formed in a cylindrical shape. A circumference of the cylindrical rod 14 is preferably 16 mm to 27 mm, more preferably 20 mm to 26 mm, and even more preferably 21 mm to 25 mm. A full length (length in a horizontal direction) of the rod 14 is not particularly limited but is preferably 40 mm to 90 mm, more preferably 50 mm to 75 mm, and even more preferably 50 mm to 60 mm.

The rod 14 includes a tobacco part 24 filled with the tobacco filler 23, a filter part 26 including a suction port 25, a connecting part 27 connecting the tobacco part 24 and the filter part 26, and an air vent part 28. The air vent part 28 has two or more through holes so as to penetrate the connecting part 27 in the thickness direction. The two or more through holes are formed so as to be arranged radially as viewed from an extension of the central axis of the rod 14. In the present embodiment, the air vent part 28 is provided in the connecting part 27, but may be provided in the filter part 26. Further, in the present embodiment, the two or more through holes of the air vent part 28 are provided side by side in a row at regular intervals on one ring, but may be provided side by side in two rows at regular intervals on two rings; alternatively, the air vent part 28 with the one or two rows may be provided in a discontinuous or irregular manner. When the user holds the suction port 25 to inhale, outside air is taken into the mainstream smoke through the air vent part 28.

The filter part 26 takes a cylindrical shape. The filter part 26 includes a rod-shaped first segment 31 filled with acetyl cellulose acetate fibers and a rod-shaped second segment 32 likewise filled with acetyl cellulose acetate fibers. The first segment 31 is located on a side of the tobacco part 24. The first segment 31 may include a hollow part. The second segment 32 is located on a side of the suction port 25. The second segment 32 is solid. Each of the first segment 31 and the second segment 32 is wrapped with an inner plug wrapper 33. The first segment 31 and the second segment 32 are connected by an outer plug wrapper 34. The outer plug wrapper 34 is bonded to the first segment 31 and the second segment 32 by a vinyl acetate-based emulsion adhesive or the like.

The length of the filter part 26 can be, for example, 10 to 30 mm, the length of the connecting part 27 can be, for example, 10 to 30 mm, the length of the first segment 31 can be, for example, 5 to 15 mm, and the length of the second segment 32 can be, for example, 5 to 15 mm. The lengths of these individual segments are one example, and can be appropriately changed according to production suitability, required quality, the length of the tobacco part 24, or the like.

For example, the first segment 31 (center hole segment) includes a first filling layer having one or more hollow parts and the inner plug wrapper 33 covering the first filling layer. The first segment 31 has a function of increasing the strength of the second segment 32. The first filling layer of the first segment 31 is filled with, for example, cellulose acetate fibers at a high density. The cellulose acetate fibers are cured through addition of a triacetin-containing plasticizer in an amount of, for example, 6 to 20% by mass with respect to the mass of the cellulose acetate. The hollow part of the first segment 31 has an inner diameter of, for example, φ1.0 to φ5.0 mm.

The first filling layer of the first segment 31, for example, may be formed with a relatively high fiber-filling density, or with a density equivalent to the fiber-filling density of a second filling layer of the second segment 32 described later. Therefore, at the time of the inhalation, air or aerosol flows only through the hollow part, and almost no air or aerosol flows through the first filling layer. For example, when it is desired to diminish the decrease in aerosol component due to filtration in the second segment 32, for example, the length of the second segment 32 may be shortened to make the first segment 31 longer accordingly.

Replacing the shortened second segment 32 with the first segment 31 is effective in increasing the delivery of aerosol components. Since the first filling layer of the first segment 31 is a fiber filling layer, the feeling of touch from the outside during use does not cause discomfort to the user.

The second segment 32 includes a second filling layer and the inner plug wrapper 33 covering the second filling layer. The second segment 32 (filter segment) is filled with cellulose acetate fibers at a typical density and has performance of filtering typical aerosol components.

The filtration performance for filtering aerosol (mainstream smoke) emitted from the tobacco part 24 may be different between the first segment 31 and the second segment 32. At least one of the first segment 31 and the second segment 32 may contain flavor. The filter part 26 may take any structure, and may have a structure in which multiple segments are provided as described above or may be formed of a single segment.

The connecting part 27 has a cylindrical shape. The connecting part 27 includes a paper tube 35 obtained by, for example, forming thick paper into a cylindrical shape, and a lining paper 36 enclosing the paper tube 35. One surface (inner surface) of the lining paper 36 is coated with a vinyl acetate-based emulsion adhesive on the entire or almost the entire surface except the vicinity of the air vent part 28. The lining paper 36 is wound in a cylindrical shape around the outside of the tobacco part 24, the paper tube 35, and the filter part 26 to connect them integrally. A plurality of air vent parts 28 are formed by laser processing from the outside after the tobacco part 24, the paper tube 35, and the filter part 26 are integrated by the lining paper 36.

The tobacco part 24 has a cylindrical shape. A full length (a length in the axial direction) of the tobacco part 24 is preferably, for example, 20 to 70 mm, more preferably 20 to 50 mm, and even more preferably 20 to 30 mm. A cross sectional shape of the tobacco part 24 is not particularly limited, and may be for example, a circle, an ellipse, a polygon, or the like.

The tobacco part 24 includes the tobacco filler 23 and a wrapper 41 enclosing the tobacco filler 23. The wrapper 41 wraps around the tobacco filler 23. The first sheet 43 of the wrapper 41 may contain a flavor component (first flavor component), as described below. The tobacco filler 23 is formed of a cut rag of leaf tobacco (dried leaf) and/or a sheet-molded material that is cut to a predetermined width of a sheet into which pulverized leaf tobacco is molded. The tobacco filler 23 is formed by being filled with a cut piece (sheet-shaped molded material) having a predetermined width from a sheet into which pulverized leaf tobacco is molded and/or a cut rag of a leaf tobacco (dried leaf) in a random orientation. This sheet-molded material may contain an aerosol-generating base material and a second flavor component. The aerosol-generating base material and the second flavor component may be added to or contained in the cut rag of leaf tobacco. Examples of the aerosol-generating base material include glycerin, propylene glycol (PG), triethylcitrate (TEC), triacetin, and 1,3-butanediol. These may be used alone or in combination of two or more.

[Tobacco Filler]

The tobacco filler (tobacco filling material) 23 according to the present invention includes tobacco and the aerosol-generating base material. The tobacco filler 23 may further include a second flavor component described below, water, or the like. There are no particular restrictions on the size of the tobacco used as the tobacco filler 23 or the method for preparing it. As the tobacco filler 23, for example, dried tobacco leaf cut into strips having a width of 0.8 to 1.2 mm may be used. When the tobacco leaf is cut in the above width, the tobacco leaf cut rags will have a length of approximately 1 to 40 mm. Alternatively, the dried tobacco leaf may be pulverized and homogenized so as to have an average particle size of about 20 to 200 μm, processed into a sheet, and then cut into strips (sheet-molded material) having a width of 0.8 to 1.2 mm to be included as the tobacco filler 23. When the sheet is cut into the above width, the cut rags will have a length of approximately 1 to 40 mm. Further, the above sheet-processed material that is gathered instead of being cut may be used as the tobacco filler 23. Various kinds of tobacco can be used for the tobacco included in the tobacco filler 23 regardless of whether the dried tobacco leaf is cut or used as a pulverized and homogenized sheet. For the tobacco filler 23, flue-cured tobacco, burley tobacco, oriental tobacco, domestic tobacco, or other varieties such as *Nicotiana tabacum* L., *Nicotiana rustica* L., and *Nicotiana tomentosa* may be blended as appropriate to realize an intended taste. Details of the tobacco varieties are disclosed in "Encyclopedia of Tobacco, Tobacco Academic Studies Center, 2009.3.31". There are conventional methods for pulverizing tobacco to process it into a homogenized sheet. The first is a filtered-out sheet made by a papermaking process; the second is a cast sheet made by mixing a suitable solvent such as water and a required kind/amount of a binder with a pulverized tobacco material, homogenizing the mixture, and then thinly casting the homogenized mixture on a plate or plate belt made of metal, and drying the cast mixture; and the third is a rolled sheet made by mixing a suitable solvent such as water and a required kind/amount of a binder with a pulverized tobacco material, homogenizing the mixture, and extruding the homogenized mixture into a sheet shape. Details of the kinds of the uniform sheet are disclosed in "Encyclopedia of Tobacco, Tobacco Academic Studies Center, 2009.3.31".

It is preferable that for the tobacco filler 23, the aerosol-generating base material and the second flavor be applied to or contained in the leaf tobacco (dried leaf) and the sheet into which pulverized leaf tobacco is molded. The aerosol-generating base material is preferably contained in an amount of 10 to 30% by weight with respect to the leaf tobacco (dried leaf) and the sheet into which the pulverized leaf tobacco is molded. The aerosol-generating base material is a material capable of generating an aerosol through heating; and examples thereof include glycerin, propylene glycol (PG), triethylcitrate (TEC), triacetin, and 1,3-butanediol. These may be used alone or in combination of two or more. The filling density of the tobacco filler 23 is not particularly limited, but is usually 250 mg/cm$^3$ or more, preferably 320 mg/cm$^3$ or more, and usually 520 mg/cm$^3$ or less, preferably 420 mg/cm$^3$ or less, from the viewpoint of ensuring the performance of the rod 14 (non-combustible heating-type smoking article) and imparting a decent smoking taste. To be specific, when the tobacco part 24 has a circumference of 22 mm and a length of 20 mm, the range of the content of the tobacco filler 23 in the tobacco part 24 can be from 200 to 400 mg, preferably from 250 to 320 mg, per tobacco part 24.

The second flavor component contained in the tobacco filler 23 is not limited and can be any type of flavor provided that it is a flavor used for the electric heating-type smoking system 11. The second flavor component used can be one selected from the group consisting of: menthol; natural plant flavors (e.g., cinnamon, sage, herb, chamomile, kudzu (*Pueraria lobata*), hydrangeae *dulcis* folium, clove, lavender, cardamom, caryophyllus, nutmeg, bergamot, geranium, honey essence, rose oil, lemon, orange, *cassia* bark, caraway, jasmine, ginger, coriander, vanilla extract, spearmint, peppermint, *cassia*, coffee, celery, cascarilla, sandalwood, cocoa, ylang ylang, fennel, anise, licorice, St John's bread, prune extract, and peach extract); saccharides (e.g., glucose, fructose, isomerized saccharide, and caramel); cocoa (e.g., powder and extract); esters (e.g., isoamyl acetate, linalyl acetate, isoamyl propionate, and linalyl butyrate); ketones (e.g., menthone, ionone, damascenone, and ethyl maltol); alcohols (e.g., geraniol, linalool, anethole, and eugenol); aldehydes (e.g., vanillin, benzaldehyde, and anisaldehyde); lactones (e.g., γ-undecalactone and γ-nonalactone); animal flavors (e.g., musk, ambergris, civet, and castoreum); hydrocarbons (e.g., limonene and pinene); and extract of tobacco plant (tobacco leaf, tobacco stem, tobacco flower, tobacco root, and tobacco seed). Menthol is particularly preferred. Alternatively, as the second flavor component, two or more kinds selected from the above group may be mixed and used.

The second flavor component may be used as a solid, or may be used by being dissolved or dispersed in a suitable solvent such as propylene glycol, ethyl alcohol, benzyl alcohol, and triethyl citrate. A flavor which easily forms a dispersion state in a solvent by addition of an emulsifier, such as a hydrophobic flavor and oil-soluble flavor, may be preferably used. Such second flavor components may be used alone or in combination.

Figure 3:
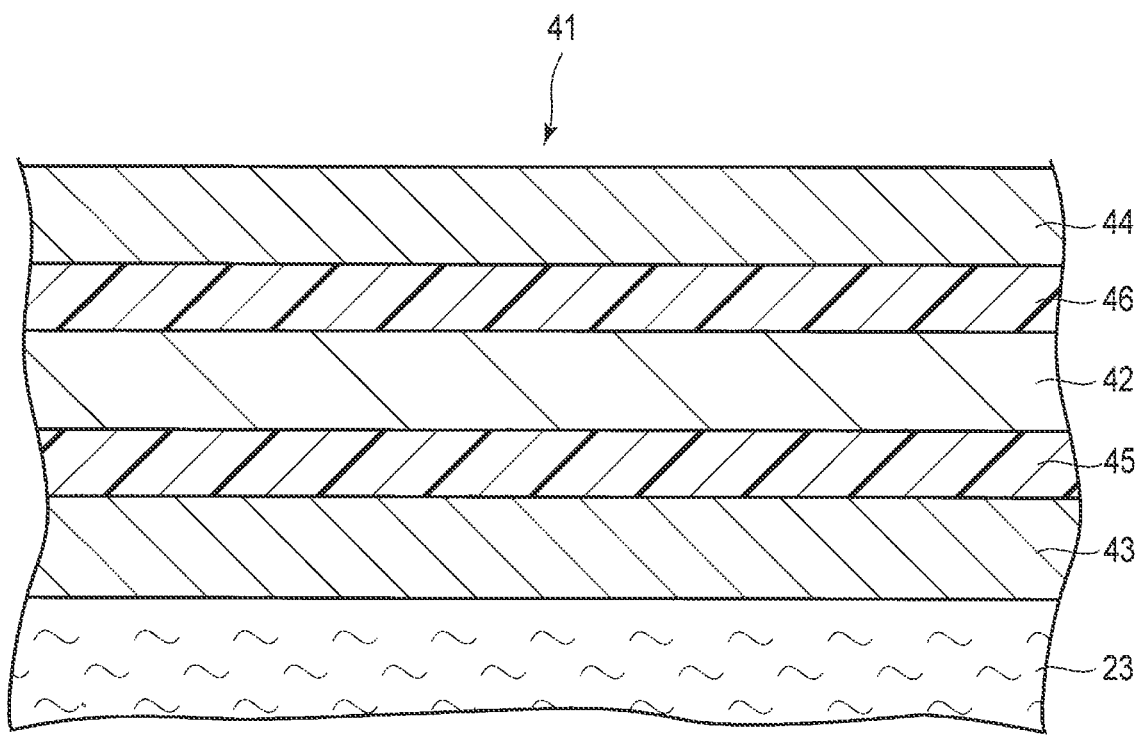
FIG. 3 is a cross-sectional view of a wrapper of a tobacco part for the rod shown in FIG. 1.

As shown in FIG. 3, the wrapper 41 includes a substrate sheet 42 made of metal, a first sheet 43 (inner sheet) made of paper, a second sheet 44 (outer sheet) made of paper, a first bonding part 45 bonding the substrate sheet 42 and the first sheet 43, and a second bonding part 46 bonding the substrate sheet 42 and the second sheet 44. The first sheet 43 is bonded to one surface of the substrate sheet 42 on a side of the tobacco filler 23. The second sheet 44 is bonded to the other surface of the substrate sheet 42 opposite to the one surface. Accordingly, the wrapper 41 has the appearance of paper on both its front and back sides.

The wrapper 41 has a basis weight of 40 to 80 g/m$^2$. The wrapper 41 has a thickness of 50 to 100 μm. The wrapper 41 has a stiffness of 20 to 60 cm$^3$/100 in the longitudinal direction according to Clark measurement (JIS P 8143 2009, paper-rigidity test method-Clark rigidity tester method). Here, the longitudinal direction refers to the lengthwise direction (axial direction) of the rod 14.

The substrate sheet 42 is formed of a metal foil having a decent thermal conductivity. The material forming the metal foil of the substrate sheet 42 is preferably a metal foil which has a decent thermal conductivity and which is inexpensive and resistant to rust and has high workability; for example, one selected from the group consisting of aluminum, copper, gold, silver, and tin, or an alloy of any of these, can be used. A thickness of the substrate sheet 42 is preferably 6 to 18 μm, more preferably 6 to 12 μm, and even more preferably 6 to 8 μm. The lower limit of the thickness of the substrate sheet 42 is determined by, for example, the ease of handling when the substrate sheet 42, the first sheet 43, and the second sheet 44 are attached to each other. That is, if the thickness of the substrate sheet 42 is less than 6 μm, the strength will be insufficient, and the substrate sheet 42 upon being attached would be more likely to tear. The upper limit of the thickness of the substrate sheet 42 is determined by, for example, the appearance qualities of the tobacco part 24 and the rod 14. That is, if the thickness of the substrate sheet 42 is greater than 18 μm, the wrapper 41 would have an increased rigidity (stiffness), and the roundness of the tobacco part 24 and the rod 14 from rolling into a cylindrical shape would be more likely to decrease. The material forming the metal foil of the substrate sheet 42 is preferably aluminum from the viewpoint of fire resistance, corrosion resistance, workability, manufacturing cost, etc.

The first bonding part 45 bonds the substrate sheet 42 to the first sheet 43 preferably over the entirety of their surfaces. The second bonding part 46 bonds the substrate sheet 42 to the second sheet 44 preferably over the entirety of their surfaces. The first bonding part 45 and the second bonding part 46 are preferably formed of, for example, a vinyl acetate-based emulsion adhesive. Alternatively, the first bonding part 45 and the second bonding part 46 may be formed of, for example, starch glue.

The first sheet 43 and the second sheet 44 have a basis weight of 20 to 45 g/m². Paper forming the first sheet 43 and the second sheet 44 may have the same basis weight or the like, or may have different basis weights or the like.

The first flavor component contained in the first sheet 43 is not limited and can be any type of flavor provided that it is a flavor used for the electric heating-type smoking system 11. The first flavor component used can be one selected from the group consisting of: menthol; natural plant flavors (e.g., cinnamon, sage, herb, chamomile, kudzu (*Pueraria lobata*), hydrangeae *dulcis* folium, clove, lavender, cardamom, caryophyllus, nutmeg, bergamot, geranium, honey essence, rose oil, lemon, orange, *cassia* bark, caraway, jasmine, ginger, coriander, vanilla extract, spearmint, peppermint, *cassia*, coffee, celery, cascarilla, sandalwood, cocoa, ylang ylang, fennel, anise, licorice, St John's bread, prune extract, and peach extract); saccharides (e.g., glucose, fructose, isomerized saccharide, and caramel); cocoa (e.g., powder and extract); esters (e.g., isoamyl acetate, linalyl acetate, isoamyl propionate, and linalyl butyrate); ketones (e.g., menthone, ionone, damascenone, and ethyl maltol); alcohols (e.g., geraniol, linalool, anethole, and eugenol); aldehydes (e.g., vanillin, benzaldehyde, and anisaldehyde); lactones (e.g., γ-undecalactone and γ-nonalactone); animal flavors (e.g., musk, ambergris, civet, and castoreum); hydrocarbons (e.g., limonene and pinene); and extract of tobacco plant (tobacco leaf, tobacco stem, tobacco flower, tobacco root, and tobacco seed). Menthol is particularly preferred. Alternatively, as the first flavor component, two or more kinds selected from the above group may be mixed and used. The first flavor component may be the same as the second flavor component or may be different from the second flavor component. The first flavor component may contain an aerosol-generating base material, and the aerosol-generating base material of this first flavor component may be the same as or different from the aerosol-generating base material contained in the above tobacco filler 23. Also, the aerosol-generating base material may be contained in the first sheet 43. The aerosol-generating base material contained in the first sheet 43 may be the same as or different from the aerosol-generating base material contained in the tobacco filler 23.

The first flavor component may be used as a solid, or may be used by being dissolved or dispersed in a suitable solvent such as propylene glycol, ethyl alcohol, benzyl alcohol, and triethyl citrate. A flavor which easily forms a dispersion state in a solvent by addition of an emulsifier, such as a hydrophobic flavor and oil-soluble flavor, may be preferably used. Such first flavor components may be used alone or in combination.

A proportion of the total mass of the first flavor component (flavor component of the first sheet 43) per tobacco part 24 (i.e., rod 14) to the total mass of the second flavor component (flavor component of the tobacco filler 23) per tobacco part 24 (i.e., rod 14) is preferably 5 to 15%. The content of the second flavor component in the tobacco filler 23 is not particularly limited, and is usually 10,000 ppm or more, preferably 20,000 ppm or more, and more preferably 25,000 ppm or more from the viewpoint of imparting a decent smoking taste. Also, the content of the second flavor component in the tobacco filler 23 is usually 50,000 ppm or less, preferably 40,000 ppm or less, and more preferably 33,000 ppm or less.

(Operation of Electric Heating-type Smoking System)

Figure 4:
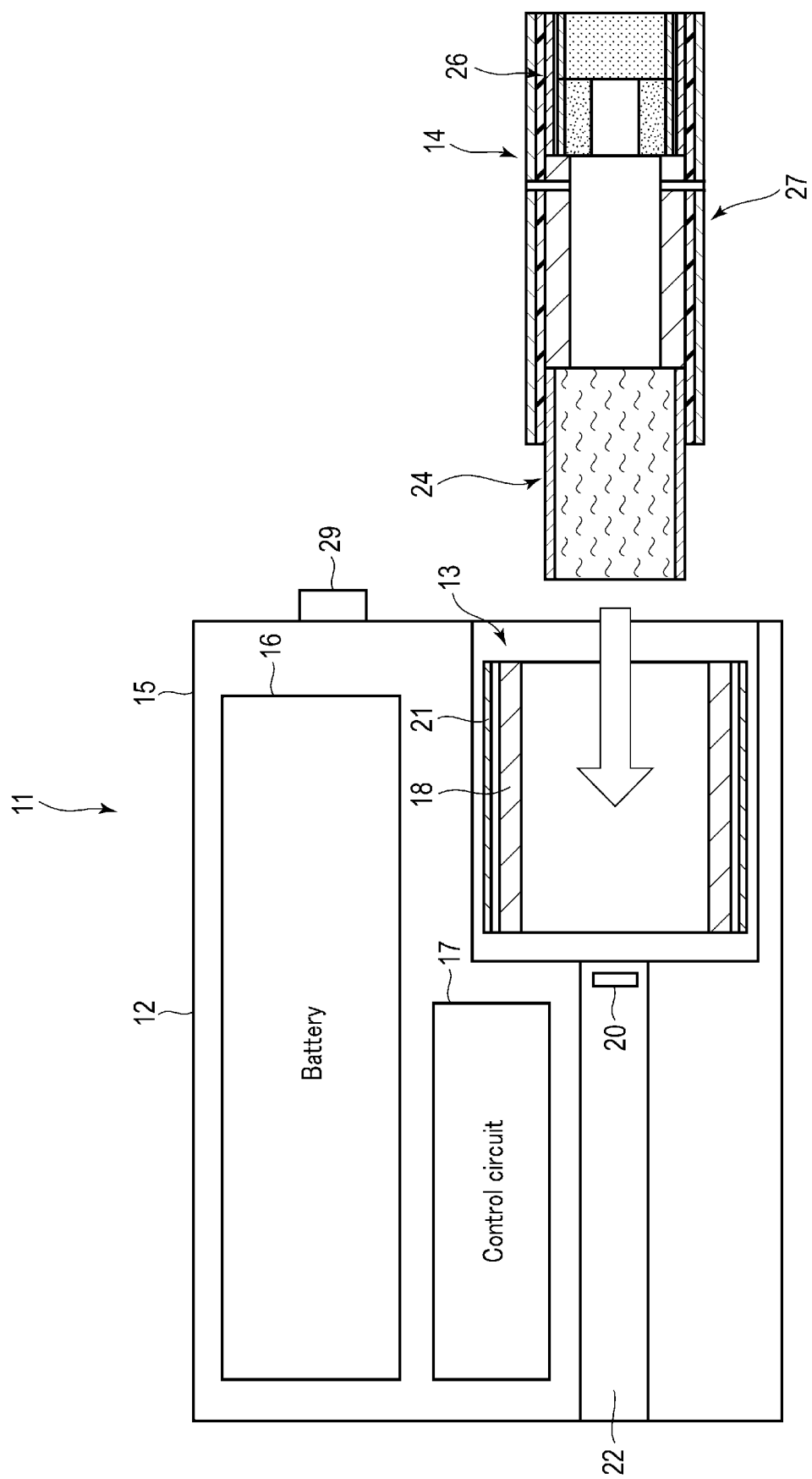
FIG. 4 is a cross-sectional schematic diagram illustrating a process of inserting a rod into a main body of an electric heating-type smoking system according to an embodiment.
Figure 5:
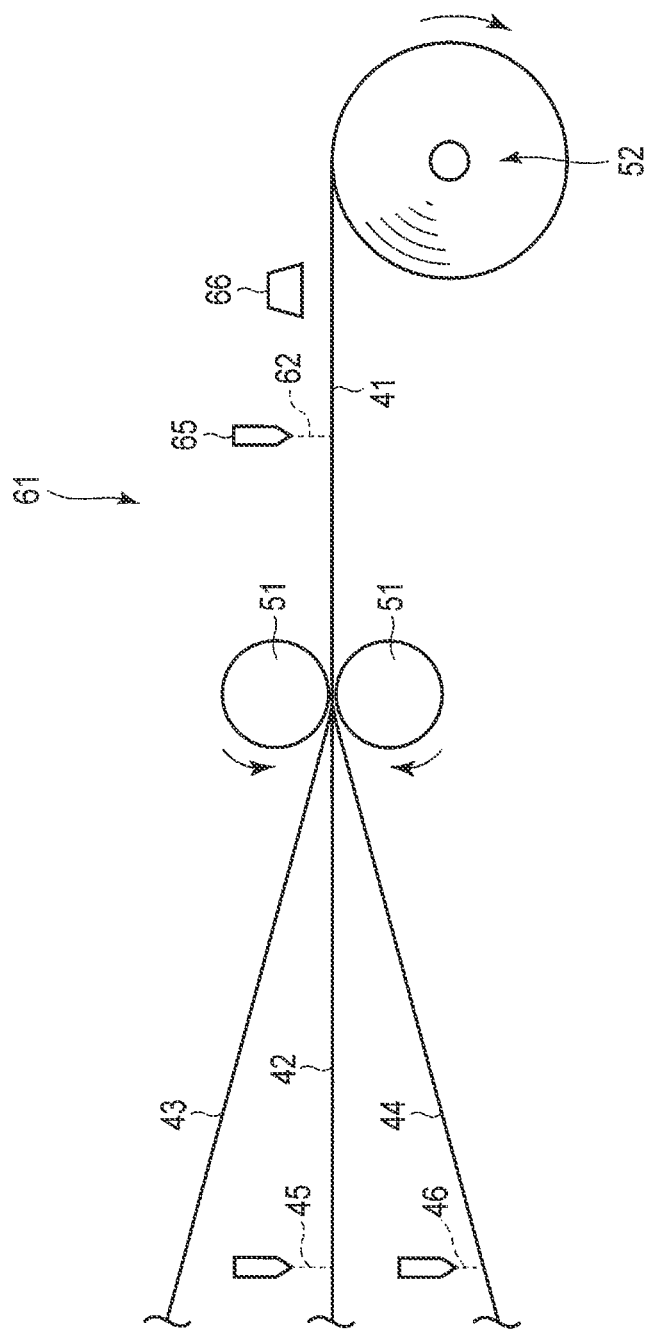
FIG. 5 is a front view of a production line in a first production method for the wrapper shown in FIG. 3.

As shown in FIG. 4, by inserting the rod 14 into the insertion part 13 of the main body 12, the main body 12 is equipped with the rod 14. In this state, when the user pushes down a switch 29 to activate the main body 12, the control circuit 17 drives the heater 21 to have the temperatures of the heater 21 and the heat transfer part 18 raised to a predetermined temperature (for example, 100 to 400° C.). Thereby, the tobacco part 24 is heated. In this state, when the user holds the suction port 25 and starts inhaling, vapor (aerosol) containing smoke aroma of tobacco is emitted from the tobacco part 24. The vapor is cooled by the air flowing into the inside of the connecting part 27 from the air vent part 28, and thereby more reliable aerosolization (formation of minute droplets) is performed.

The aerosol is appropriately filtered by the filter part 26 and delivered to the user's oral cavity. This allows the user to taste the smoke aroma of tobacco. At this time, the control circuit 17 senses a negative pressure in the housing 15 through the pressure sensing part 20. The control circuit 17 thus can count the number of times the user has inhaled and calculate the total inhalation time. The control circuit 17 stops the heating of the heater 21 and the heat transfer part 18 when a predetermined time elapses after the switch 29 is pressed, the user performs a predetermined number of inhalations, the total inhalation time of the user exceeds a predetermined time, or the user presses the switch 29 again to release the active state. One smoking operation thus ends. Then, by removing the used rod 14 from the insertion part 13 and inserting a new rod 14 into the insertion part 13, the user can again taste the tobacco smoke aroma from the new rod 14.

(First Production Method)

A method for producing the electric heating-type smoking system 11 of the present embodiment will be described. Various methods can be used for producing the electric heating-type smoking system 11; however, example production methods (a first production method and a second production method) will be described below. The first production method will be described with reference to FIG. 5. First, in a wrapper production line 61, the first sheet 43 and the second sheet 44 are bonded to the substrate sheet 42. At that time, a vinyl acetate-based emulsion adhesive intended to serve as the first bonding part 45 is applied to, for example, one surface of the substrate sheet 42. In parallel with, prior to, or subsequent to this, a vinyl acetate-based emulsion adhesive intended to serve as the second bonding part 46 is applied to, for example, one surface of the second sheet 44.

Thereafter, the substrate sheet 42, the first sheet 43, and the second sheet 44 are passed between a pair of rollers 51 so as to bond the first sheet 43 and the second sheet 44 to the substrate sheet 42. The wrapper 41 having them integrated may be cut in a predetermined width by a cutter or the like as necessary. Note that this cutting process may be performed after the integrated wrapper 41 is wound into a roll shape. In addition, any method can be taken for bonding the substrate sheet 42, the first sheet 43, and the second sheet 44; as a matter of course, an operator may manually attach the substrate sheet 42, the first sheet 43, and the second sheet 44 to each other without using the roll pair 51. Alternatively, as a matter of course, the sheets may be attached to the substrate sheet 42 one by one to form the wrapper 41 by, for example, using a roller instead of the roller pair 51 to bond the first sheet 43 to one surface of the substrate sheet 42 and winding it up once with a bobbin 52, and then again using the roller to bond the second sheet 44 to the other surface of the substrate sheet 42 and winding it up with the bobbin 52.

Subsequent to the bonding process, the first flavor component 62 is applied to the first sheet 43 of the wrapper 41. The first flavor component 62 dissolved in ethyl alcohol or the like is applied to the first sheet 43 from a nozzle 65. In the middle of the production line 61, it can be monitored through a camera 66 provided downstream of the nozzle 65 whether the first flavor component 62 is evenly applied onto the first sheet 43. After the ethyl alcohol or the like evaporates through a drying process in the production line 61, the wrapper 41 is wound around the bobbin 52 to finish the wrapper 41. The wrapper 41 is cut into a predetermined width as necessary. The wrapper 41 wound around the bobbin 52 is packaged in a bag or the like, and sealed to store. The wrapper 41 is preferably sealed in a packaging container having a high gas barrier property, for example, a so-called vacuum pack in which nylon having a predetermined thickness and low-density polyethylene having a predetermined thickness are stacked. The wrapper 41 housed in the packaging container having the high gas barrier property is preferably stored in an environment with a temperature of 15 to 30° C. and a relative humidity of 50 to 90%.

Thereafter, the wrapper 41 is introduced into a common cigarette making machine and wound around the tobacco filler 23. At this time, the wrapper 41 is set in the cigarette making machine such that the first sheet 43 is inside (on the tobacco filler 23 side). Thereby, the tobacco part 24 is formed. The tobacco part 24 is arranged in series with a paper tube 35 and a filter part 26 that are separately prepared. The tobacco part 24, the paper tube 35, and the filter part 26 in series are integrally wound with a lining paper 36, whereby the rod 14 for the electric heating-type smoking system 11 is produced.

The main body 12 of the electric heating-type smoking system 11 can also be produced by a known producing method for an electronic device. By combining the rod 14 and the main body 12 thus produced, the electric heating-type smoking system 11 is realized.

(Second Production Method)

Figure 6:
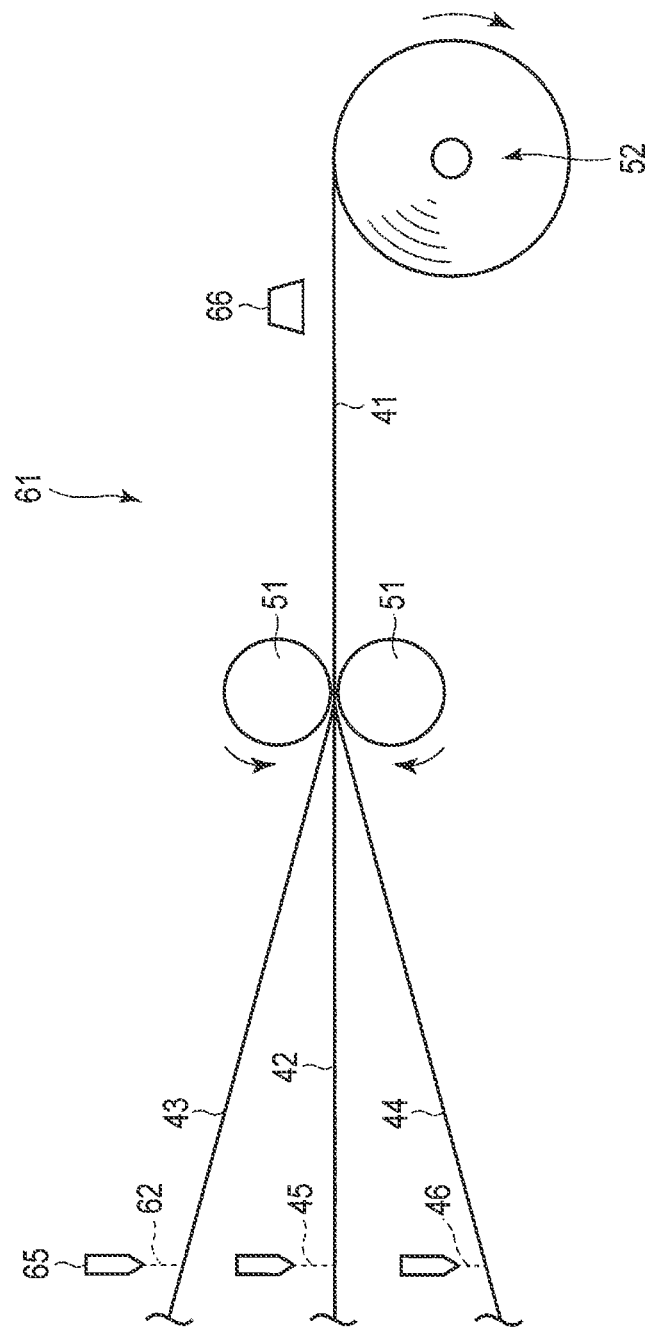
FIG. 6 is a front view of a production line in a second production method for the wrapper shown in FIG. 3.

A second production method for the smoking article of the present embodiment will be described with reference to FIG. 6. Descriptions are omitted for parts common to the first production method.

According to the second production method, in the wrapper production line 61, the first sheet 43 and the second sheet 44 are bonded to the substrate sheet 42. In parallel with, prior to, or subsequent to this, the first flavor component 62 is applied to the first sheet 43.

To be more specific, a vinyl acetate-based emulsion adhesive intended to serve as the first bonding part 45 is applied to one surface of the substrate sheet 42. Concurrently with this, a vinyl acetate-based emulsion adhesive intended to serve as the second bonding part 46 is applied to, for example, one surface of the second sheet 44. Further, at the same time as applying of these adhesives, the first flavor component 62 is applied to the first sheet 43. The first flavor component 62 dissolved in ethyl alcohol or the like is applied to the first sheet 43. In the middle of the production line 61, it can be monitored through a camera 66 provided downstream of the roller pair 51 whether the first flavor component 62 is evenly applied onto the first sheet 43.

After the first flavor component 62 is applied and the ethyl alcohol or the like evaporates, the first sheet 43 and the second sheet 44 are bonded to the substrate sheet 42 by passing between the roller pair 51. The wrapper 41 thus integrated is formed. The wrapper 41 is cut into a predetermined width as necessary. Then, the wrapper 41 is wound around the bobbin 52 to finish the wrapper 41. The wrapper 41 wound around the bobbin 52 is packaged in a bag or the like, and sealed to store. The wrapper 41 is stored preferably in a packaging container having a high gas barrier property in an environment with a temperature of 15 to 30° C. and a relative humidity of 50 to 90%. The following process is the same as that in the first production method.

According to the embodiment, the following can be said.

The rod 14 (non-combustible heating-type smoking article) includes the tobacco filler 23, and the wrapper 41 enclosing the tobacco filler 23, in which the wrapper 41 includes: the substrate sheet 42 made of metal; the first sheet 43 made of paper and bonded to one surface of the substrate sheet 42 on a side of the tobacco filler 23; and the second sheet 44 made of paper and bonded to another surface of the substrate sheet 42 on a side opposite to the one surface.

According to this configuration, the wrapper 41 includes the substrate sheet 42 made of metal, and the rod 14 including the tobacco filler 23 and the wrapper 41 can thus be made nonflammable. This can prevent the user accidentally igniting the rod 14 from smoking like a traditional cigarette. Also, since both the front and back surfaces of the wrapper 41 can be made to have a paper appearance, the appearance around the wrapper 41 can be similar to that of a traditional cigarette. This prevents a user who has gotten accustomed to the appearance of a traditional cigarette from having a feeling of discomfort. Also, since the front and back surfaces of the wrapper 41 can be made of paper material, the wrapper 41, even when introduced into a conventional cigarette making machine, can be produced at a high speed without fine scratches on the surface of the wrapper 41. Note that when the inventors introduced only the substrate sheet 42 as the wrapper 41 into a conventional cigarette making machine, it was confirmed that the surface of the substrate sheet 42 had fine scratches and that the appearance was deteriorated. When both surfaces were made of paper as in the present embodiment, the surface of the wrapper 41 had no fine scratches.

In addition, since the wrapper 41 is made of paper on both the front and back surfaces, gluing performance comparable to that in a conventional traditional cigarette can be displayed. This makes it possible to provide a smoking article that can be produced at a high speed by using a current cigarette making machine with no modification thereto.

The first sheet 43 may also contain the first flavor component 62. According to this configuration, in addition to the flavor applied to or contained in the tobacco filler 23, the first sheet 43 may also contain the flavor component. Therefore, for example, even when the amount of flavor applied to or contained in the tobacco filler 23 is the maximum permissible amount, more flavor can be imparted to the non-combustible heating-type smoking article by including the first flavor component 62 in the first sheet 43. This makes it possible to further add flavor to the non-combustible heating-type smoking article for shipping to countries, regions, etc. where a smoking article with a stronger smoke aroma is preferred, and to provide flexibility for product design. In addition, because of the wrapper 41 including the substrate sheet 42 made of metal, the flavor component can be prevented from penetrating the wrapper 41 to form a stain on the surface. Thus, even when the first sheet 43 is made to have the first flavor component 62, a stain formed by the flavor penetrating will not occur on the surface of the wrapper 41. This makes it possible to improve the appearance quality of the non-combustible heating-type smoking article.

The tobacco filler 23 includes the second flavor component that is the same as or different from the first flavor component 62, and the proportion of the total mass of the first flavor component 62 per non-combustible heating-type smoking article to the total mass of the second flavor component per non-combustible heating-type smoking article is 5 to 15%. According to this configuration, when the first flavor component 62 is the same as the second flavor component, the total flavor per non-combustible heating-type smoking article can be increased. On the other hand, when the first flavor component 62 is different from the second flavor component, flexibility can be provided for the product design of the non-combustible heating-type smoking article. Thus, by layering different flavors, a wide range of tobacco smoke aroma can be given, or a non-combustible heating-type smoking article with a slightly different variation of the smoke aroma can be added to a lineup. Note that the mass of the first flavor component 62 that the first sheet 43 can contain is only 5 to 15% of the mass of the second flavor component contained in the tobacco filler 23, which is enough to make the tobacco smoke aroma thick or to change the tobacco smoke aroma.

In this case, the wrapper 41 includes the first bonding part 45 bonding the substrate sheet 42 to the first sheet 43, and the second bonding part 46 bonding the substrate sheet 42 to the second sheet 44; and the first bonding part 45 and the second bonding part 46 are a vinyl acetate-based emulsion adhesive or a starch glue.

According to this configuration, the substrate sheet 42 and the first sheet 43 are bonded, and the substrate sheet 42 and the second sheet 44 are bonded. With these configurations, a wrapper 41 having uniform rigidity and the like can be configured. In addition, the inventors have experimentally found that use of the vinyl acetate-based emulsion adhesive or starch glue as the first bonding part 45 and the second bonding part 46 can achieve a strong wrapper 41 in which the first sheet 43 or the second sheet 44 does not come off from the substrate sheet 42.

In this case, the first sheet 43 and the second sheet 44 have a basis weight of 20 to 45 g/m². According to this configuration, a wrapper 41 that is not too hard and moderately flexible can be realized.

In this case, the substrate sheet 42 has a thickness of 6 to 18 μm. According to this configuration, a wrapper 41 that is not too hard and moderately flexible can be realized.

The tobacco filler 23 is formed by being filled with a cut rag of a sheet-molded material into which pulverized leaf tobacco is molded and/or a cut rag of tobacco leaf in a random orientation. According to this configuration, the tobacco part 23 can be made to look like a traditional cigarette, which can prevent a user from having a feeling of discomfort.

The non-combustible heating-type smoking article includes the filter part 26 for filtering aerosol generated from the tobacco filler 23, and the tubular connecting part 27 connecting the filter part 26 and the tobacco part 24 wound with the wrapper 41; and the connecting part 27 includes the air vent part 28. According to this configuration, it is possible to appropriately dilute the aerosol emitted from the tobacco filler 23 by taking in outside air through the air vent part 28. The aerosol concentration thus can be adjusted appropriately, which can provide multiple variations of the non-combustible heating-type smoking articles with different aerosol concentrations.

The filter part 26 includes the first segment 31 having a hollow part and the solid second segment 32 adjacent to the first segment 31. According to this configuration, it is possible to change the delivery amount of the aerosol to the user's oral cavity by changing the ratio between the length of the first segment 31 and the length of the second segment 32. This makes it possible to easily increase or decrease the delivery amount of the aerosol according to product destinations, etc.; and designing of the product can be made easy.

The first flavor component 62 is menthol. In general, menthol has high permeability through paper or the like. Therefore, for example, when menthol is included inside the wrapper, the menthol penetrates the wrapper during the storage of the non-combustible heating-type smoking article, which often causes radial raising (raising formed due to menthol) mainly on the wrapper or causes stains on the wrapper due to the menthol penetrating. According to the above configuration, the barrier effect of the substrate sheet 42 made of metal prevents the menthol placed inside from penetrating the wrapper 41, which can prevent the wrapper 41 from having the raising due to the menthol during the storage, or prevent the stains from occurring on the wrapper 41. This makes it possible to significantly reduce the possibility of a defect in the non-combustible heating-type smoking article.

The electric heating-type smoking system includes the above-described non-combustible heating-type smoking article and the heater 21 for heating the non-combustible heating-type smoking article. According to this configuration, by driving the heater 21, the non-combustible heating-type smoking article can be heated, and the non-combustible smoking article can be realized with a simple structure.

In the production method for the non-combustible heating-type smoking article, the first sheet 43 made of paper is bonded to the inner surface side of the substrate sheet 42 made of metal, and the second sheet 44 made of paper is bonded to the outer surface side of the substrate sheet 42, thereby forming the wrapper 41; the first sheet 43 contains the first flavor component 62; and the wrapper 41 is wound around the tobacco filler 23 with the first sheet 43 inside to produce the rod 14 (non-combustible heating-type smoking article).

According to this configuration, the non-combustible heating-type smoking article having the first sheet 43 containing the flavor component can be realized through a very simple process. Further, since the first sheet 43 is placed on the inside, the first flavor component 62 does not penetrate the substrate sheet 42, and no stain due to the first flavor component 62 will occur on the surface of the wrapper 41. This makes it possible to improve the appearance quality of the non-combustible heating-type smoking article. In addition, because the first sheet 43 can be made to have the first flavor component 62, the flexibility in designing the product can improve.

In another embodiment of the production method for the non-combustible heating-type smoking article, the first sheet 43 made of paper contains the first flavor component 62; the first sheet 43 is bonded to one surface of the substrate sheet 42 made of metal and the second sheet 44 made of paper is bonded to the other surface of the substrate sheet 42 to form the wrapper 41; and the wrapper 41 is wound around the tobacco filler 23 with the first sheet 43 inside to produce the non-combustible heating-type smoking article. According to this configuration, the non-combustible heating-type smoking article having the. first sheet 43 containing the flavor component can be realized through a very simple process. Further, in contrast to the aforementioned method, the first sheet 43 and the second sheet 44 can be bonded to the substrate sheet 42 at the same time as having the first sheet 43 contain the first flavor component 62. This can shorten the production line and reduce the manufacturing cost.

The non-combustible heating-type smoking article and the electric heating-type smoking system 11 are not limited to the above-described embodiment or each modification example and can be embodied in practice by modifying the structural elements without departing from the gist of the invention. In addition, some of the structural elements may be deleted from each of the embodiments.

Examples

The electric heating-type smoking system 11 for Examples was produced as follows as one example.
[Production Line and Packaging Container]

The substrate sheet 42, the first sheet 43, and the second sheet 44 were prepared with a width of 1045 mm. Then, the first sheet 43 was bonded to one surface of the substrate sheet 42 using the first bonding part 45. As the first bonding part 45, a vinyl acetate-based emulsion adhesive was used. Then, the second sheet 44 was bonded to the other surface of the substrate sheet 42 using the second bonding part 46. As the second bonding part 46, a vinyl acetate-based emulsion adhesive was used. In the manner described above, an integrated wrapper 41 having a width of 1045 mm was formed. Then, the wrapper 41 having the 1045 mm width was wound into a roll shape. This roll of the wrapper 41 was cut so as to have a width of 48.6 mm using a slitter. Furthermore, a roll-shaped wrapper 41 cut into a width of 53 mm was fed out in the feeding direction, and menthol as the first flavor component 62 was applied to the first sheet 43. The menthol was dissolved in ethyl alcohol to apply to the third sheet 43. The amount of menthol applied was 1.76 mg per tobacco part 24 having a circumference of 24.5 mm and a total length of 56 mm.

After evaporating of the ethyl alcohol, the wrapper 41 was wound around the bobbin 52 and sealed in a vacuum pack (packing container). The vacuum pack was constructed by laminating nylon having a thickness of 25 μm and low-density polyethylene having a thickness of 100 μm.
[Tobacco Part]

The tobacco filler 23 was prepared by pulverizing dried tobacco leaf so as to have an average particle size of about 20 to 200 μm, homogenizing the pulverized tobacco leaf, molding it into a sheet, and cutting the sheet into strips having a width of 0.8 mm and a length of 1 to 40 mm. The tobacco filler 23 having the pulverized tobacco leaf thus molded into the sheet was made to contain the aerosol-generating base material and the second flavor (menthol). The tobacco filler 23 having the pulverized tobacco leaf molded into the sheet was made to contain 17% by weight of the aerosol-generating base material. In addition, the content of menthol in the tobacco filler 23 was 39000 ppm. As the aerosol-generating base material, glycerin was used. The tobacco filler 23 thus configured was filled inside the wrapper 41 in a random orientation.
[Wrapper]

The substrate sheet 42 was formed by an aluminum foil having a thickness of 6 μm. The first sheet 43 and the second sheet 44 were formed of pure white roll paper having a basis weight of 20 g/m². As the first bonding part 45 and the second bonding part 46, a vinyl acetate-based emulsion adhesive was used. The vinyl acetate-based emulsion adhesive was applied to the entirety of both surfaces of the substrate sheet 42.

[Cigarette Making Machine]

Rolling for the tobacco part 24 was performed using the wrapper 41 and the tobacco filler 23 prepared in the manner described above.

In rolling for the tobacco part 24, a cigarette making machine Protos M5 manufactured by Hauni was used.

Since the wrapper including a metal foil was used, an automatic control device in microwave transmission for tobacco filling density, built into the Protos M5, was not operated, and adjustment of the tobacco filling density was manually performed. With the above conditions, the tobacco part 24 having a circumference of 24.5 mm and a full length of 56 mm was produced at a rate of 5000 pieces/min. This demonstrated that the production efficiency of the tobacco part 24 of this example was relatively good. In addition, there were few samples having noticeable scratches formed on the exterior of the tobacco part 24.
[Amount of First Flavor Applied and Storage Stability of First Flavor]

Menthol was used as the first flavor contained in the first sheet 43 of wrapper 41. The first sheet 43 was coated with or immersed in 1.76 mg of menthol per tobacco part 24 having a circumference of 24.5 mm and a full length of 56 mm. This wrapper 41 was sealed in a vacuum pack. The wrapper 41 sealed with the vacuum pack in this manner was stored in an environment having a temperature of 22° C. and a relative humidity of 60%. After 14 days, the vacuum pack was opened again and the amount of menthol was measured; as a result, it was confirmed that 1.69 g of menthol remained per tobacco part 24. Therefore, the amount of decrease in menthol was 4% or less, and the storage stability of menthol was good.
[Evaluation of Appearance Quality of Tobacco Part]

Evaluation was made as to whether, in the tobacco part 24 (with a circumference of 24.5 mm and a full length of 56 mm) of this example, after being stored for 14 days, the first flavor (menthol) contained in the first sheet 43 (inner sheet) penetrated the substrate sheet 42 to blot the second sheet 44. The result was that all of the 200 samples had no blot of menthol. Therefore, the appearance quality of the tobacco part 24 after storage was good.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-combustible heating smoking article comprising:
    a suction port and a distal end opposite the suction port; and
    a tobacco part including:
    a tobacco filler; and
    a non-flammable wrapper directly enclosing the tobacco filler, the wrapper including:
    a substrate sheet made of metal extending to the distal end;
    a first sheet made of paper and bonded to one surface of the substrate sheet on a side of the tobacco filler; and
    a second sheet made of paper and bonded to one other surface of the substrate sheet on a side opposite to the one surface,
    wherein the wrapper of the tobacco part extends to the distal end of the smoking article,
    wherein the wrapper has a thickness of 50 to 100 μm, and
    wherein the wrapper has a basis weight of 40 to 80 g/m².

2. The non-combustible heating smoking article according to claim 1, wherein the first sheet includes a first flavor component.

3. The non-combustible heating smoking article according to claim 2, wherein:
the tobacco filler includes a second flavor component that is the same as or different from the first flavor component, and
a proportion of a total mass of the first flavor component to a total mass of the second flavor component is 5 to 15%.

4. The non-combustible heating smoking article according to claim 1, wherein:
the wrapper includes:
a first bonding part bonding the substrate sheet and the first sheet together; and
a second bonding part bonding the substrate sheet and the second sheet together, and
the first bonding part and the second bonding part are made of a vinyl acetate-based emulsion adhesive or a starch glue.

5. The non-combustible heating smoking article according to claim 1, wherein the first sheet and the second sheet have a basis weight of 20 to 45 g/m2.

6. The non-combustible heating smoking article according to claim 1, wherein the substrate sheet has a thickness of 6 to 18 μm.

7. The non-combustible heating smoking article according to claim 1, wherein the tobacco filler is formed by being filled with a cut rag of leaf tobacco and/or a cut piece of a sheet into which pulverized leaf tobacco is molded, in a random orientation, and the cut piece having a predetermined width.

8. The non-combustible heating smoking article according to claim 1, further comprising:
a filter part configured to filter an aerosol generated from the tobacco filler; and
a tubular connecting part connecting the filter part and the wrapper,
wherein the connecting part includes an air vent part.

9. The non-combustible heating smoking article according to claim 8, wherein:
the filter part comprises:
a first segment including a hollow part; and
a second segment that is solid and adjacent to the first segment.

10. The non-combustible heating smoking article according to claim 2, wherein the first flavor component includes menthol.

11. An electric heating smoking system comprising:
the non-combustible heating smoking article according to claim 1; and
a heater configured to heat the non-combustible heating smoking article.

12. A manufacturing method for a non-combustible heating smoking article having a suction port and a distal end opposite the suction port, the method comprising: forming a non-flammable wrapper, the forming the wrapper including:
bonding a first sheet made of paper to one surface of a substrate sheet made of metal which extends to the distal end, and
bonding a second sheet made of paper to one other surface of the substrate sheet on a side opposite to the one side;
making the first sheet contain a first flavor component; and
rolling the wrapper around a tobacco filler with the first sheet inside to directly enclose the tobacco filler,
wherein the wrapper of the tobacco filler extends to the distal end of the smoking article,
wherein the wrapper has a thickness of 50 to 100 m, and
wherein the wrapper has a basis weight of 40 to 80 g/m$^2$.

13. The manufacturing method for the non-combustible heating smoking article with the tobacco filler according to claim 12, the method comprising making the tobacco filler contain a second flavor component that is the same as or different from the first flavor component, wherein a proportion of a total mass of the first flavor component to a total mass of the second flavor component is 5 to 15%.

14. A manufacturing method for a non-combustible heating smoking article having a suction port and a distal end opposite the suction port, the method comprising:
making a first sheet made of paper contain a first flavor component;
forming a non-flammable wrapper, the forming the wrapper including:
bonding the first sheet to one surface of a substrate sheet made of metal extending to the distal end, and
bonding a second sheet made of paper to one other surface of the substrate sheet on a side opposite to the one surface to form a wrapper; and
rolling the wrapper around a tobacco filler with the first sheet inside to directly enclose the tobacco filler,
wherein the wrapper of the tobacco filler extends to the distal end of the smoking article,
wherein the wrapper has a thickness of 50 to 100 μm, and
wherein the wrapper has a basis weight of 40 to 80 g/m$^2$.

15. The manufacturing method for the non-combustible heating smoking article with the tobacco filler according to claim 14, the method comprising making the tobacco filler contain a second flavor component that is the same as or different from the first flavor component, wherein a proportion of a total mass of the first flavor component to a total mass of the second flavor component is 5 to 15%.

16. The non-combustible heating smoking article according to claim 1, wherein the substrate sheet made of metal, the first sheet made of paper and the second sheet made of paper are coextensive with each other.

17. The non-combustible heating smoking article according to claim 1, wherein a stiffness in a lengthwise direction of the smoking article is 20 to 60 cm$^3$/100 according to the Clark measurement.

18. The manufacturing method for the non-combustible heating smoking article with the tobacco filler according to claim 12, wherein a stiffness in a lengthwise direction of the smoking article is 20 to 60 cm$^3$/100 according to the Clark measurement.

19. The manufacturing method for the non-combustible heating smoking article with the tobacco filler according to claim 14, wherein a stiffness in a lengthwise direction of the smoking article is 20 to 60 cm$^3$/100 according to the Clark measurement.

20. The non-combustible heating smoking article according to claim 1, wherein the distal end of the non-combustible heating smoking article is inserted into a device with a heater configured to heat the tobacco part of the non-combustible heating smoking article.

* * * * *